United States Patent [19]

Fertl et al.

[11] 4,263,509

[45] Apr. 21, 1981

[54] METHOD FOR IN SITU DETERMINATION OF THE CATION EXCHANGE CAPACITIES OF SUBSURFACE FORMATIONS

[75] Inventors: Walter H. Fertl; David W. Welker, both of Houston, Tex.

[73] Assignee: Dresser Industries, Inc., Dallas, Tex.

[21] Appl. No.: 15,538

[22] Filed: Feb. 26, 1979

[51] Int. Cl.³ .......................... G01V 5/00; E21B 49/02
[52] U.S. Cl. ........................................ 250/255; 73/153
[58] Field of Search ...................... 250/253, 255, 301; 73/153

[56] References Cited

U.S. PATENT DOCUMENTS

| | | | |
|---|---|---|---|
| 3,711,765 | 1/1973 | Overton | 73/153 |
| 3,770,378 | 11/1973 | Russell | 73/153 |
| 3,940,610 | 2/1976 | Dennis et al. | 250/253 |

OTHER PUBLICATIONS

Rush and Jenkins, "New Method Finds Cation Exchange Capacity Quickly and Economically" published in *The Oil and Gas Journal,* May 15, 1978.

Primary Examiner—Alfred E. Smith
Assistant Examiner—Janice A. Howell
Attorney, Agent, or Firm—Richard M. Byron

[57] ABSTRACT

A method is disclosed for the in situ examination of each subsurface formation penetrated by a borehole to ascertain the cation exchange capacity of such formations within a geological region. Natural gamma ray logging is used to develop signals functionally related to the total gamma radiation and to the potassium −40, uranium and thorium energy-band radiations. A first borehole is traversed by a potential gamma ray spectrometer to provide selected measurements of natural gamma radiation. Core samples are taken from the logged formation and laboratory tests performed to determine the cation exchange capacity thereof. The cation exchange capacities thus are developed then correlated with selected parameters provided by the gamma ray spectrometer to establish functional relationships. Cation exchange capacities of formations in subsequent boreholes within the region are then determined in situ by use of the natural gamma ray spectrometer and these established relationships.

8 Claims, 3 Drawing Figures

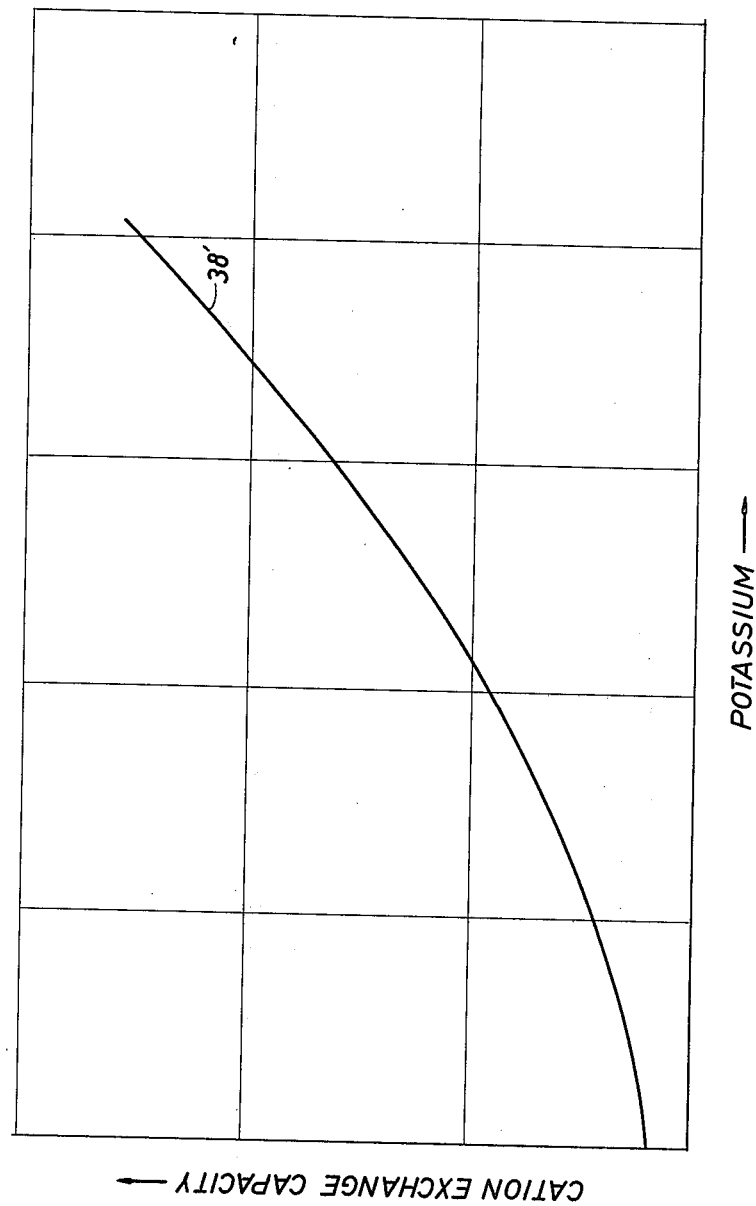

METHOD FOR IN SITU DETERMINATION OF THE CATION EXCHANGE CAPACITIES OF SUBSURFACE FORMATIONS

BACKGROUND OF THE INVENTION

The present invention relates to radioactivity well logging and, more particularly, to a method using natural gamma ray logging for in situ determination of the cation exchange capacity of subsurface formations traversed by a borehole.

The evaluation of petroleum reservoirs requires the knowledge of several fundamental reservoir properties. One such property of particular importance is water saturation, Sw. In a typical oil field, water, called interstitial water, and frequently free gas are present in addition to oil. Water saturation is that portion of the subsurface formation pore volume, also called porosity of the formation, which is occupied by interstitial water. The fraction of the formation pore volume not occupied by interstitial water is said to be occupied by hydrocarbons. Oil, condensate or gas in place will vary directly with the equation, (1-Sw), where Sw is the interstitial water expressed as a fraction of porosity and generally will vary inversely with porosity. Thus, with a decrease in porosity water saturation will increase and with an increase in porosity, water saturation will decrease, with a concurrent opposite change in oil and gas saturation.

In addition to indicating the relative volume occupied by formation water, Sw serves as an indication of hydrocarbon recovery difficulties. The amount of water saturation in the formation will assist in determining the ease with which oil moves through rock. There will be a greater resistance to the flow of hydrocarbons through formations containing 60% water saturation than through the same formations in which water saturation is low, since interstitial water will block some of the flow channels in the formation. Only where water saturation is low, say less than 40% of total pore volume, will oil and gas saturation be sufficient to have producing formations.

Early prior art method for determining water saturation and thus hydrocarbon saturation of formations consisted of laboratory analysis of formation samples. These methods required formation coring and subsequent treating of the recovered cores which treatment can cause great changes in water and hydrocarbon content. True proporportions of the various fluids originally present cannot be obtained by analysis of a core that contains drilling fluid. Additionally, obtaining core samples from subterranean formations is a time consuming and costly undertaking since a large number of samples is required.

Due to problems encountered with attempts to determine water saturation from core samples, a number of interpretive concepts have been developed for indirectly estimating water saturation. The majority of these interpretive techniques have proven less than accurate over the entire range of formation conditions. Varying salinity and shale conditions encountered in the samples have presented particular problems.

It has been determined that there are very few oil-producing sands that are entirely free of clay minerals. The term shaly sand is used to describe reservoir rock having a clay content above five percent. Clay as a rock form is difficult to define precisely because of the wide variety of clay-grade material which may consist of varying relative amount of non-clay and clay mineral components. Non-clay materials include calcite, dolomite, large flakes of mica, pyrite, feldspar, gibbsite and other minerals. Generally, fine grained materials have been called "clay" so long as they had distinct plasticity and insufficient amounts of coarser material. Some clay materials found in subsurface formations are smectite, illite, kaolinite and chlorite.

Since clay minerals are abundant throughout sedimentary columns, all formation log readings must be corrected for the effects of the clay. Clay corrections assume that the clay deposited during the various phases of a continuous sedimentation cycle has the same composition throughout the complete cycle. By assuming that the clay materials are all equivalent, clay corrections can more easily be calculated and applied. However, results have been found to be unrealistic under some formation conditions resulting in appraisal which have been too pessimistic in some zones and which may condemn some zones of commercial significance.

An additional failing of prior interpretive concepts is that most of these techniques do not take into account the fact that the influence of clay minerals on formation measurements are non-linear. It has been found that formation resistivity will become progressively greater in a non-linear fashion as the formation water becomes fresher. This non-linear relation is because the effective concentration of clay-exchange cations increases in proportion to decreases in water saturation.

Cation exchange is the reaction whereby hydrated positively charged ions of a solid, such as clay, are exchanged, equivalent for equivalent, for cations of like charge in saturation. A physical model well known in the art describing shaly sand conductivities which accounts for dispersed clay in hydrocarbon bearing shaly sand formations is:

$$S_w^{-n^*} = \left( \frac{R_t}{F^* \cdot R_w} \right) \left( 1 + \frac{R_w \cdot B \cdot Q_v}{S_w} \right) \quad (1)$$

where:
Sw=percent of water saturation
n*=saturation exponent
Rt=formation resistivity
F*=formation resistivity factor
Rw=formation water resistivity
B=equivalent conductance of clay exchange cations as a function of Rw
Qv=concentration of counter ions in the formation water in contact with the clay.

Basically the model describes the resistivity, or the reciprocal conductivity, of shaly sands as a function of the salinity concentration and amount of formation water occupying pore space; the concentration and mobility of exchangeable cations associated with the various clay minerals; and, formation temperature. Accepted experimental data indicates that this physical model allows for improved analysis in shaly sand formations, over the entire salinity range encountered in potential reservoir rocks.

The historical problem with the above physical model is in obtaining a value fo the concentration of counter ions (Qv) in the formation water in contact with the clay. Qv can be calculated from the cation exchange capacity, porosity and grain matrix density. Expressed mathematically:

$$Qv = CEC \cdot (1-\phi) \cdot \rho ma \cdot \phi^{-1} \qquad (2)$$

where,
CEC = cation exchange capacity
$\phi$ = porosity
$\rho ma$ = grain matrix density Porosity and grain matrix density are determined by the results derived from well logging data well known in the art. However, in the art, the remaining term, CEC, is determined by taking formation core samples from each well evaluated. This core sampling process has the liabilities discussed heretofore. Although tedious, costly and time consuming, coring is used to establish an empirical relationship between porosity ($\phi$) and the concentration of counter ions (Qv) in the formation in contact with clay to derive a normalized term relating to Cation Exchange Capacity. However, this approach has many limitations. The limitations include porosity variations due to grain size changes and the amount of cementation, all of which are independent of shaliness, clay content, and thus Qv variations.

Accordingly, the present invention overcomes the deficiencies of the prior art by providing a method for utilizing information derived from a correlation of core sample data from a single borehole with information derived from the natural gamma ray well logging of that borehole to establish a relationship which can be utilized in subsequent boreholes to estimate the cation exchange capacity of formations surrounding the borehole.

SUMMARY OF THE INVENTION

A high-resolution, gamma ray spectrometer incorporated in a well logging instrument is caused to traverse a borehole, whereby natural gamma radiation strikes the scintillation crystal contained therein. The striking of the crystal by a natural gamma ray will cause the crystal to emit photons in the visible energy region the intensity of which is proportional to the energy lost in the crystal by the incident gamma ray. Light energy from the crystal is optically coupled to a photomultiplier tube where the energy is converted to an electrical current which is then amplified and transmitted to the surface. This current is proportioned to the light energy absorbed by the multiplier tube from the crystal. The current is converted to a pulse having a voltage amplitude linearly related to the energy of the incident gamma rays.

Upon reaching the surface, the pulses are passed through a multi-channel analyzer where the pulses are sorted for each depth point according to amplitude and therefore coupled into channels which strip out information relating to the three most commonly logged radioactive isotopes according to their peak energies with potassium —40 having a peak energy of 1.46 MeV, uranium a peak energy of 1.76 MeV, and thorium a peak energy of 2.62 MeV.

The stripped signals from each of the three channels as well as the total gamma ray counts detected by the crystal are coupled into individual count rate meters (CRM), each of which accumulates a total number of detected gamma rays in an associated channel signal. Next, the outputs from each CRM is coupled into a logging camera or can be converted into digital form and then recorded on a digital tape device. Additionally the data can be combined to provide ratio signals related to any selected combination of CRM outputs.

Core samples are taken from the logged well and analyzed under laboratory conditions for cation exchange capacity. The laboratory results are correlated with selected parameters derived from the natural gamma ray spectrometer logging. This provides an empirical relationship which can be used within a geological region for in situ determination of the cation exchange capacity by logging subsequent boreholes with a natural gamma ray spectrometer. The data can then be used for reliable determination of the concentration of clay-exchange cations and further determination of water saturation.

Accordingly, it is an object of the present invention to provide a method for in situ determination of the cation exchange capacity of subsurface formations within a geological region.

It is a further object of the present invention to use such in situ determination of cation exchange capacity to provide a method for determining porosity normalized concentrations of clay-exchange cations in the subsurface formations.

BRIEF DESCRIPTION OF THE DRAWINGS

FIG. 3 is an alternate embodiment of FIG. 2 using the potassium energy level as the log instrument parameter.

DETAILED DESCRIPTION OF THE PREFERRED EMBODIMENT

Many long-life radioactive nuclides occur in nature. Of particular interest to the petroleum industry are those of potassium (K), uranium (U), and thorium (Th), all of which are found in various degrees in subsurface formations and as constituents of potential reservoir rocks. As hereinafter described, detection of these nuclides can be accomplished by gamma ray spectroscopy methods which identify characteristic gamma rays. An apparatus for measuring these characteristic gamma rays is described in the article "Natural gamma-ray spectral logging", by Lock and Hoyer, SPWLA symposium transactions, 1971.

Figure 1:
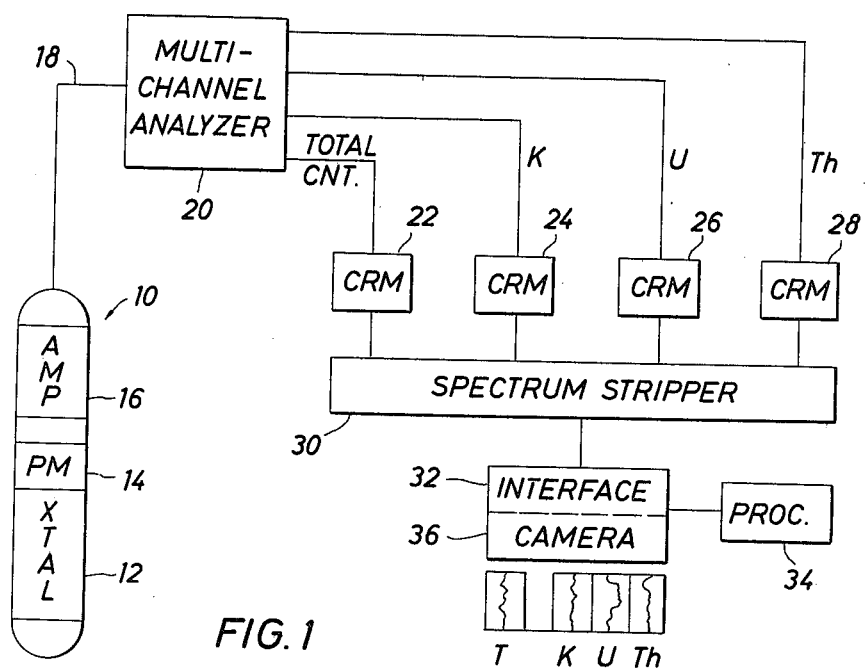
FIG. 1 is a simplified block diagram of an apparatus for performing the well logging of the present invention.

Referring now to FIG. 1, there is illustrated in block diagram form an apparatus for performing the well logging technique of the present invention. A logging instrument 10 is shown which includes a high-resolution gamma spectrometer comprised of a large cylindrical sodium-iodide, thallium activated crystal 12 which is optically coupled with a photo multiplier tube 14 for producing output electrical signals representative of natural gamma radiation measured by passing the logging instrument 10 through a borehole (not shown) penetrating earth formations (not shown).

As is well known in the art, natural gamma radiation from various resources within the earth formation impinges upon scintillation crystal 12, producing light flashes wherein whose intensity is proportional to the energy released due to the collision of the gamma ray with the crystal, thereby causing the scintillation. The light flashes thus produced are detected by photo multiplier tube 14 which produces an electrical pulse whose amplitude or voltage level is proportional in intensity to the above described light flash.

These electrical signals, in the form of pulses, are coupled into amplifier 16 for amplification and transmission to the surface by way of conductor 18 which forms a component of a conventional well logging cable (not shown). The amplified pulses, representative of the energy of the naturally occurring gamma radiation in the earth formations, are coupled into a multi-channel analyzer 20 which sorts gamma radiation as a function of energy, separating the energy into at least three energy channels or bands representative of the radioactive decay of isotopes of potassium, uranium and thorium. Additionally, a fourth energy channel containing the total measured spectrum is provided. Signals from total radiation, potassium, uranium and thorium channels are coupled into count rate meter 22, 24, 26 and 28 respectively. Each count rate meter 24, 26 and 28 accumulates a background radiation corrected count rate for the particular isotope associated therewith, with count rate meter 22 accumulating the total number of gamma rays detected by crystal 12 to provide an indication of the total gamma radiation detected.

Accordingly, the multi-channel analyzer 20, acting with count rate meters 24, 26 and 28, provide output signals representative of the number of counts occurring in each energy channel. Each count member is characteristic of the respective radioactive decay of the isotopic potassium, uranium and thorium atoms in earth formations. These output signals are coupled into a spectrum stripper 30. Spectrum stripping refers to the process whereby background radiation count rates are electronically subtracted in a mathematical process from the potassium and uranium channels. A complete description of a method of spectrum stripping can be found in U.S. Pat. No. 3,940,610, Natural Gamma Radiation Borehole Logging System, issued to Dennis, et al.

The total gamma energy spectrum signal along with the stripped energy spectrum signals for potassium, uranium and thorium are coupled into interface unit 32. Unit 32 provides the interface necessary to couple the signals to various processing and display equipment, such as computer 34 or logging camera 36 for the subsequent processing which comprises a part of the method of applicants' invention as will be hereinafter described.

In practicing the method of the preferred embodiment, a first borehole will be logged using a natural gamma radiation spectrometer, as described herein. Core samples of the formation are then removed from various depth levels within the borehole, as is well known in the art. The core samples are subjected to laboratory testing to determine the value of the cation exchange capacity of each sample. The process of laboratory analysis of core samples to determine cation exchange capacity is detailed in an article "New Method Finds Cation Exchange Capacity Quickly and Economically", by Rush and Jenkins, published in The Oil and Gas Journal, May 15, 1978.

Figure 2:
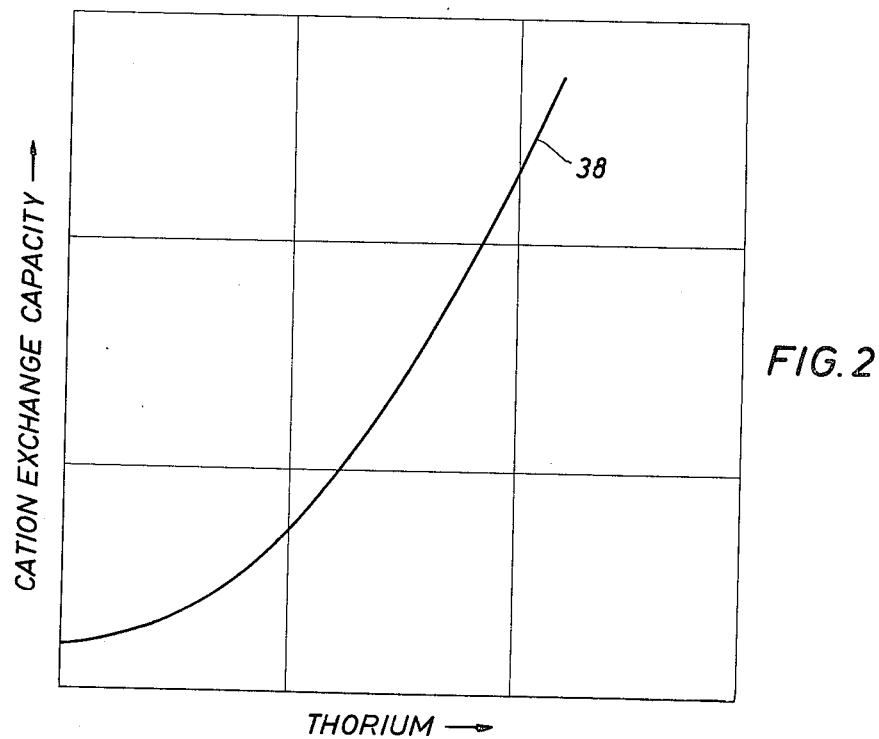
FIG. 2 is a graphic representation of the correlation of the thorium energy level provided by the logging instrument with core sample data to provide indications of the concentration of clay exchange cations.

The results of the laboratory testing functionally depth-relate the cation exchange capacity to a particular subsurface strata. A selected parameter established by the natural gamma ray logging process is correlated to the depth-related exchange capacity to provide function curves 38 and 38', graphically depicted in FIGS. 2 and 3 respectively. FIG. 2 illustrates the use of the thorium count rate as the selected parameter whereas FIG. 3 shows the potassium count rate being used. Although graphic examples using thorium and potassium are shown, it is contemplated that any parameter provided by the natural gamma ray logging process, including ratios of the gamma ray log signals derived can be used in practicing the method herein described.

When conducting logging operations in subsequent boreholes within the same geological region, for any measurement of a selected parameter provided by a natural gamma radiation spectrometer there can be established an in situ estimation of the cation exchange capacity of that formation by reference to the functional relation 38. A value of the concentration of counter ions (Qv) in the formation water in contact with the clay can then be derived by normalizing the cation exchange capacity for variations in porosity. The porosity measurements are obtained by use of a standard porosity logging device. The Qv value thus established can then be used in estimating water saturation (Sw) using the physical model previously described herein.

Thus, there has been described and illustrated herein a method in accordance with the present invention wherein a new and improved method is described which provides in situ determinations of the cation exchange capacity of subsurface formations. However, while particular embodiments of the present invention have been illustrated and described, it will be apparent to those skilled in the art that changes and modifications may be made without departing from the invention in its broader aspects.

The embodiments of the invention in which an exclusive property or privilege is claimed are defined as follows:

1. A method for determining the cation exchange of earth formations traversed by a borehole, comprising the steps of:
   generating signals functionally related to radioactive nuclides occurring naturally in the earth formations surrounding a first borehole;
   establishing depth-related cation exchange capacities from core sample taken from said first borehole at preselected depth intervals;
   establishing a functional relationship between said generated signals and said cation exchange capacities;
   generating additional signals functionally related to radioactive nuclides adjacent subsequent boreholes situated in the same geological region as said first borehole; and
   comparing said additional generated signals with said functional relationship established between said generated signals and said cation exchange capacity of said first borehole to determine the depth-related cation exchange capacity of said subsequent boreholes.

2. A method for in situ evaluation of the cation exchange capacity of earth formations traversed by a borehole, comprising the steps of:
   traversing said first borehole with a logging instrument containing a gamma ray detector;
   detecting natural gamma radiation occurring in the formations in the vicinity of said first borehole;
   generating signals functionally related to the energy and frequency of said detected gamma radiation;
   separating said signals into a plurality of energy regions, said energy regions corresponding to natural gamma radiation produced by the radioactive isotopes of potassium, uranium and thorium;
   removing core samples of said formations from various depth-related points along said first borehole;

testing said formation samples to determine the cation exchange capacity of said samples;

establishing a functional relationship between said test derived cation exchange capacities and a selected parameter relating to said plurality of energy regions;

traversing a subsequent borehole within the same geological region with said logging instrument;

detecting natural gamma radiation occurring in the earth formations in the vicinity of said subsequent borehole;

generating signals functionally related to the energy and frequency of said detected gamma radiation;

separating said signals into a plurality of energy regions corresponding to the natural gamma radiation produced by the radioactive isotopes of potassium, uranium and thorium; and determining the cation exchange capacity of said formations penetrated by said subsequent borehole by correlating said functional relationship established from said test derived cation exchange capacities and said selected parameter from said first borehole, and the same selected parameter derived from said signals obtained while logging said subsequent borehole.

3. The method of claim 2, further including the step of normalizing said cation exchange capacity estimation of said subsequent borehole formations using the porosity measurement of said formations to provide an indication of the concentration of counter ions in the formation water in contact with formation clay.

4. The method of claim 2 wherein said selected parameter used for establishing a functional relationship with said test derived cation exchange capacities correspond to the natural gamma radiation produced by radioactive isotopes of potassium.

5. The method of claim 2 wherein said selected parameter used for establishing a functional relationship with said test derived cation exchange capacities corresponds to the natural gamma radiation produced by radioactive isotopes of uranium.

6. The method of claim 2 wherein said selected parameter used for establishing a functional relationship with said test derived cation exchange capacities corresponds to the natural gamma radiation produced by radioactive isotopes of thorium.

7. The method of claim 2 wherein said selected parameter used for establishing a functional relationship with said test derived cation exchange capacities corresponds to a ratio functionally related to a plurality of said energy region signals.

8. The method of claim 3, further including the step of utilizing said cation exchange capacity evaluation to provide a correction factor for clay effect on resistivity measurements derived from said earth formations.

* * * * *